United States Patent [19]

Eggers, III et al.

[11] 4,040,865

[45] Aug. 9, 1977

[54] REMOVING CHLORINE-CONTAINING INSULATION WITH A FLUIDIZED MEDIUM CONTAINING REACTIVE CALCIUM COMPOUNDS

[75] Inventors: Frank W. Eggers, III, Hermann, Mo.; Ralph O. Wigger, Yonkers, N.Y.; Richard L. Coan, Clayton, Mo.

[73] Assignee: Cerro Corporation, New York, N.Y.

[21] Appl. No.: 648,114

[22] Filed: Jan. 12, 1976

Related U.S. Application Data

[62] Division of Ser. No. 429,967, Jan. 2, 1974, Pat. No. 3,932,118.

[51] Int. Cl.² .................. B08B 7/04; B08B 15/00
[52] U.S. Cl. .................................. 134/7; 134/18; 134/19; 134/25 R; 134/32
[58] Field of Search ............... 134/7, 18, 19, 25 R, 134/32, 38, 2, 42; 432/11, 14, 15, 16, 17, 28, 58, 72; 23/277 C; 29/403

[56] References Cited

U.S. PATENT DOCUMENTS

| | | | |
|---|---|---|---|
| 2,774,661 | 12/1956 | White | 432/14 X |
| 3,139,726 | 7/1964 | Wilson et al. | 134/19 X |
| 3,250,643 | 5/1966 | Sergent | 134/19 X |
| 3,346,417 | 10/1967 | Ehrlich | 134/25 R X |
| 3,480,477 | 11/1969 | Levin | 134/19 X |

*Primary Examiner*—S. Leon Bashore
*Assistant Examiner*—Richard V. Fisher
*Attorney, Agent, or Firm*—Gravely, Lieder & Woodruff

[57] ABSTRACT

This application describes a continuous method of removing polyvinyl chloride insulation or other volatilizable material from items such as copper wire without producing undesirable by-products. The method involves the pyrolysis of the insulation on the wire in a fluidized bed reactor charged with small particles of calcium carbonate. The calcium carbonate reacts with the gaseous chlorine from the insulation to produce calcium chloride which then is collected and can be used for snow removal, road construction, and the like. After removal of the insulation, the copper wire is cooled and cleaned. The products of combustion are passed through an afterburner to a HCl scrubber containing $CaCO_3$ where any remaining chlorine is reacted with calcium carbonate to produce $CaCl_2$. The application also describes apparatus for moving the items across the heated reactor. An alternative process involves pyrolysis of the insulation in a pyrolysis chamber, passing the products of pyrolysis through an afterburner and thence to a fluidized bed reactor which uses fluidized particles of $CaCO_3$ to remove any chlorine from the products of combustion of the afterburner. An HCl scrubber is also used as a final processing step in this form of the process to remove particulate matter and to prevent HCl emissions in the event of a system failure.

11 Claims, 7 Drawing Figures

REMOVING CHLORINE-CONTAINING INSULATION WITH A FLUIDIZED MEDIUM CONTAINING REACTIVE CALCIUM COMPOUNDS

REFERENCE TO OTHER APPLICATIONS

This is a Division of application Ser. No. 429,967 filed Jan. 2, 1974, now U.s. Pat. No. 3,932,118.

This application contains subject matter in common with co-pending application of Wigger and Eggers Ser. No. 355,287, filed Apr. 27, 1973 entitled PROCESS OF REMOVING INSULATION FROM WIRE.

BACKGROUND OF THE INVENTION

Conventionally, insulation is removed from scrap copper wire by burning or by mechanical stripping processes. These have disadvantages particularly with respect to fine copper wire. In the burning process undesirable ecological effects are produced and fine copper wire tends to be oxidized. The stripping process is not particularly satisfactory for smaller wire.

The present invention provides a continuous process for removing a gas producing insulation from an item such as copper wire and particularly for removing insulation containing polyvinyl chloride. This type insulation when subjected to a conventional pyrolysis or vaporization process produces chlorine. The chlorine is produced either as a gas or more likely as hydrochloric acid, as water vapor is present in the products of decomposition or combustion. Both of these are undesirable products from an ecological point of view.

As used in this application the term chlorine includes the gas and the acid form. The present process provides for the reaction of the hydrochloric acid (HCl) with a calcium containing substance such as calcium oxide, calcium carbonate, dolomite (part $MgCO_3$ and part $CaCO_3$), and the like, to produce calcium chloride as a by-product. The calcium chloride is used by many street and highway departments to apply to snow and ice covered streets and highways. The present process has the advantage that there are no undesirable by-products, and the emissions are conventional such as hot air, nitrogen, water vapor, and carbon dioxide.

Accordingly, one of the principal objects of the present invention is to provide a continuous process for removing insulation containing polyvinyl chloride from items such as copper wire without the formation of undesirable chlorine containing by-products. Another object is to provide an economical process which operates continuously and which produces cleaned copper wire from the process. Still another object is to provide a reaction method whereby copper wire coated with polyvinyl chloride insulation is passed through a heated fluidized bed of small particles of calcium carbonate to decompose the insulation and react the chlorine from the insulation with the calcium carbonate to produce usable calcium chloride.

These and other objects and advantages will become apparent hereinafter.

SUMMARY OF THE INVENTION

This invention comprises a continuous process for removing gas producing insulation from articles, and specifically involves the chemical reaction in a fluidized bed of a calcium compound with chlorine released from chlorine producing insulation to produce useful calcium chloride and eliminate other undesirable by-products. This invention also comprises the use of a fluidized bed reactor after the decomposition of the chlorine containing insulation and combinations of the foregoing processes.

DESCRIPTION OF THE DRAWINGS

FIG. 6 is a sectional view taken along lines 6—6 of FIG. 4, and

DETAILED DESCRIPTION

Figure 1:
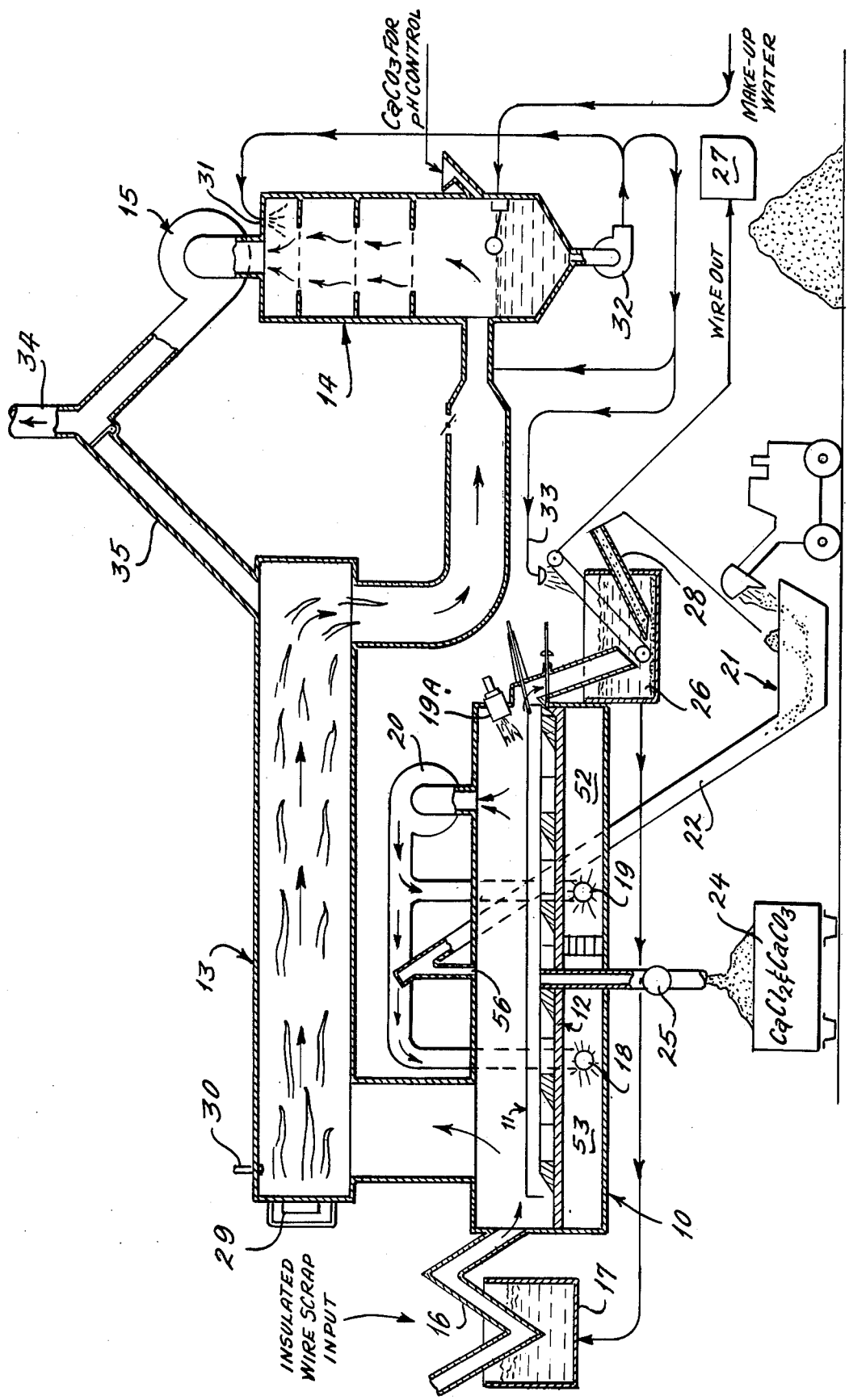
FIG. 1 is a schematic flow diagram of the process of this invention.

The continuous system of this invention (as shown in FIG. 1) comprises a fluid bed decomposition and reaction chamber 10, which includes a wire scrap advancing mechanism 11 (which is shown in FIGS. 2–6 and will be described in detail hereinafter), and a fluidized bed hearth 12; an afterburner 13; an HCl scrubber 14; and an induced draft fan 15. The input material, which preferably is insulated copper wire having polyvinyl chloride insulation, is pre-chopped in a shearing machine (not shown) from its conventional 1500 pound bale form to a size suitable for this process. The chopped wire is continuously fed from the shear to the chamber 10 at a controlled rate by a conveyor 16. The wire preferably is chopped to less than about 6 inches in size in the shearing machine. The chopped wire passes through a water seal 17 which seals the inlet of the decomposition chamber 10 from the atmosphere. The decomposition chamber 10 is divided into pyrolysis section 53 and a decomposition section 52. The pyrolysis section 53 is provided with a pyrolysis burner 18. The burner 18 normally is gas fired and maintains the first zone or pyrolysis section 53 of the chamber 10 at an operating temperature of about 600° F. with a reducing atmosphere.

A combustion burner 19 operates beneath the bed hearth 12 with reducing gas or excess air to remove the residue in the second zone or combustion section 52 of the chamber 10.

A pilot burner 19A provides mixing and safety ignition to prevent a build-up of combustible atmosphere and resulting explosion within the upper portion of the chamber 10.

A fluidizing air fan 20 keeps the bed 12 in fluidized condition.

The cut feed materials is pulled over the hearth 12 by the advancing mechanism 11 through the first section 53 of the chamber 10 where it is subjected to pyrolysis and is decomposed in a controlled atmosphere void of excess oxygen and controlled with respect to analysis and temperature by the burner 18. A calcium based compound is deposited into the top of the chamber 10 from storage 21 by a conveyor 22. The calcium based compound, preferably calcium carbonate, is from about −10 to about −200 mesh in size and is heated in the second portion 52 of the chamber 10 to a temperature sufficient to decompose the insulation on the feed. The feed material generally is heated to a temperature from about 600° to 1200° F. for best decomposition of the insulation.

The calcium carbonate is fluidized by the discharge from the burners 18 and 19 and surrounds the feed while in fluidized condition. The insulation on the feed usually contains polyvinyl chloride insulation which, when decomposed, releases chlorine. The chlorine reacts with the calcium carbonate to produce calcium chloride.

Figure 5:
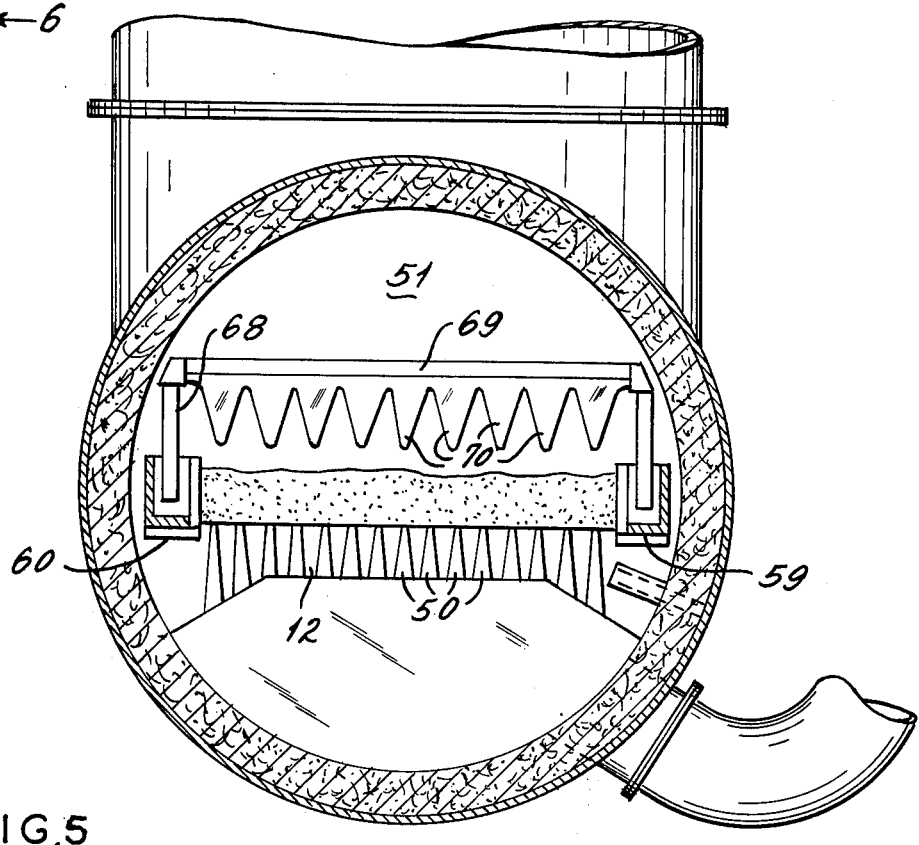
FIG. 5 is a fragmentary sectional view taken along lines 5—5 of FIG. 3.

The details of construction of the chamber 10 are shown in FIGS. 2-6. The chamber 10 generally is circular in cross-section as seen in FIGS. 5 and 6. The hearth 12 is positioned in the lower half of the chamber 10 and divides the chamber into upper and lower sections. The hearth 12 is provided with a plurality of openings 50 therethrough which connect the upper chamber 51 and the two lower chambers 52 and 53. The pyrolysis burner 18 is positioned in the plenum chamber 53 in the fluidizing air inlet.

The plenum chamber 3 constitutes a pyrolysis zone and is maintained at about 600° F. Discharges 54 and 54a from the fluidizing air fan 20 supply fluidizing gases to the chambers 53 and 52, respectively. At the end of the upper chamber 51 are the wire scrap inlet 55 and the calcium carbonate inlet 56. The gas in the chambers 52 and 53 passes through the openings 50 to fluidize the calcium carbonate above the chambers 52 and 53.

The scrap is pulled along the hearth 12 by the advancing mechanism 11. The advancing mechanism 11 comprises a rake assembly 57 and a ramp assembly 58. The rake assembly 57 and the ramp assembly 58 are movable independently and in unison.

The ramp assembly 58 comprises a base member 59 positioned in a track 60 mounted at the sides of the furnace 10 (FIG. 6). The base member 59 has spaced cam blocks 61 with inclined faces 62 mounted thereon. The base 59 is attached to a ramp pull rod 64 which is connected to a ramp drive chain 65 and thence to a variable speed reversible motor 66 through a drive axle and gear 65'. A clutch 67 allows the ramp drive to be disconnected from the motor 66. Thus, the base 59 and the cam blocks 61 can be reciprocated longitudinally in the chamber 10 along the tracks 60.

Figure 2:
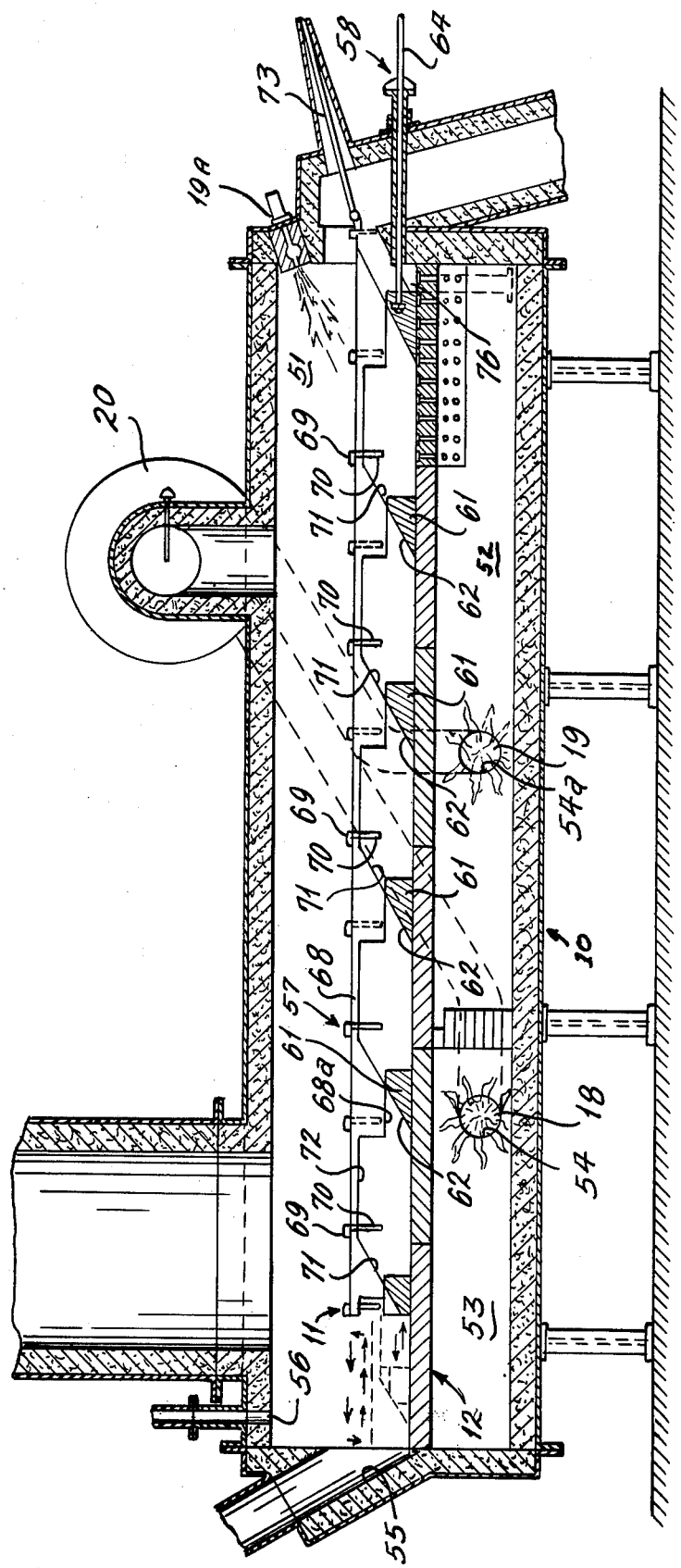
FIG. 2 is an enlarged fragmentary vertical sectional view of the fluidized bed reactor.
Figure 3:
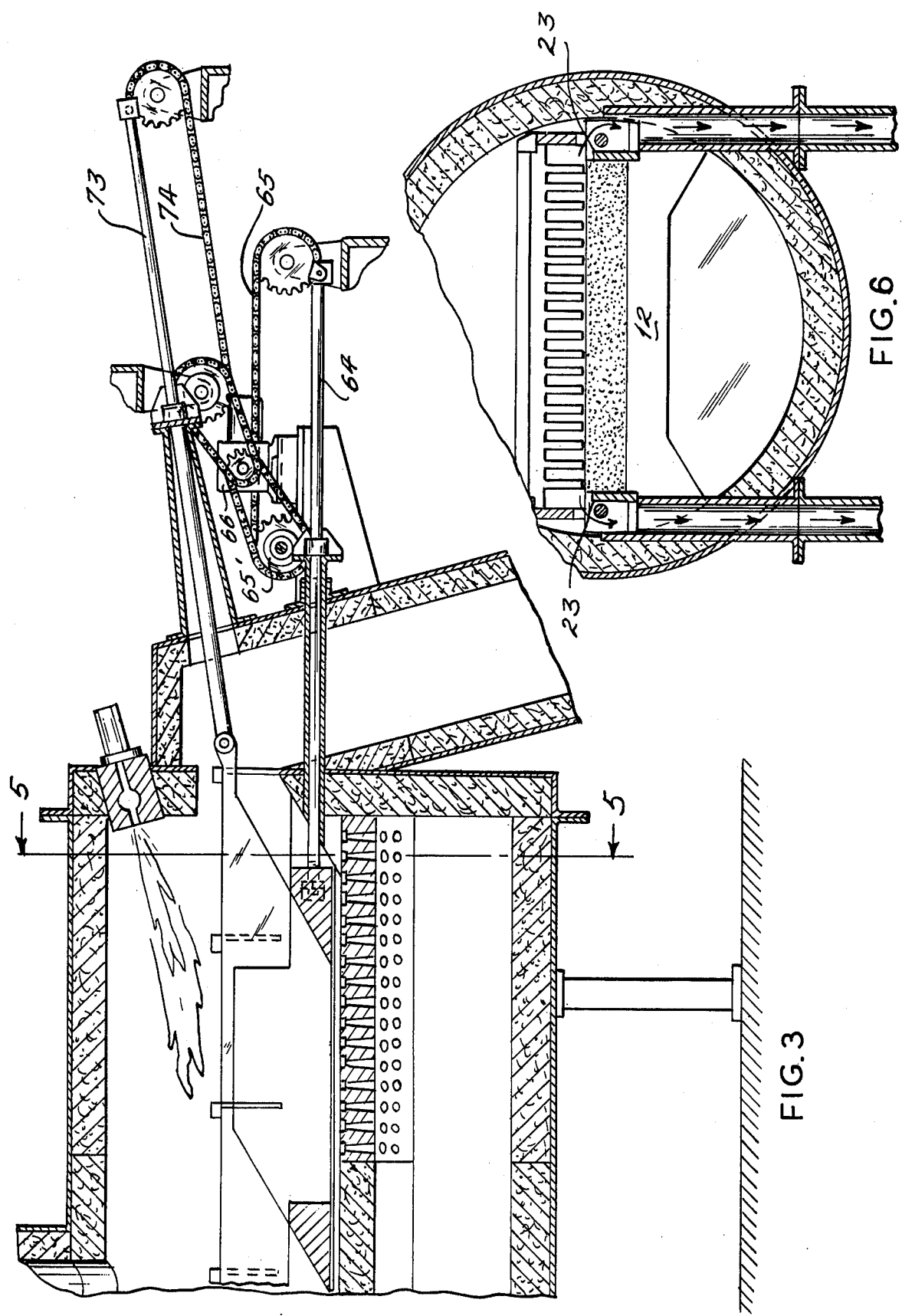
FIG. 3 is an enlarged fragmentary vertical view of the discharge end of the fluidized bed reactor.
Figure 4:
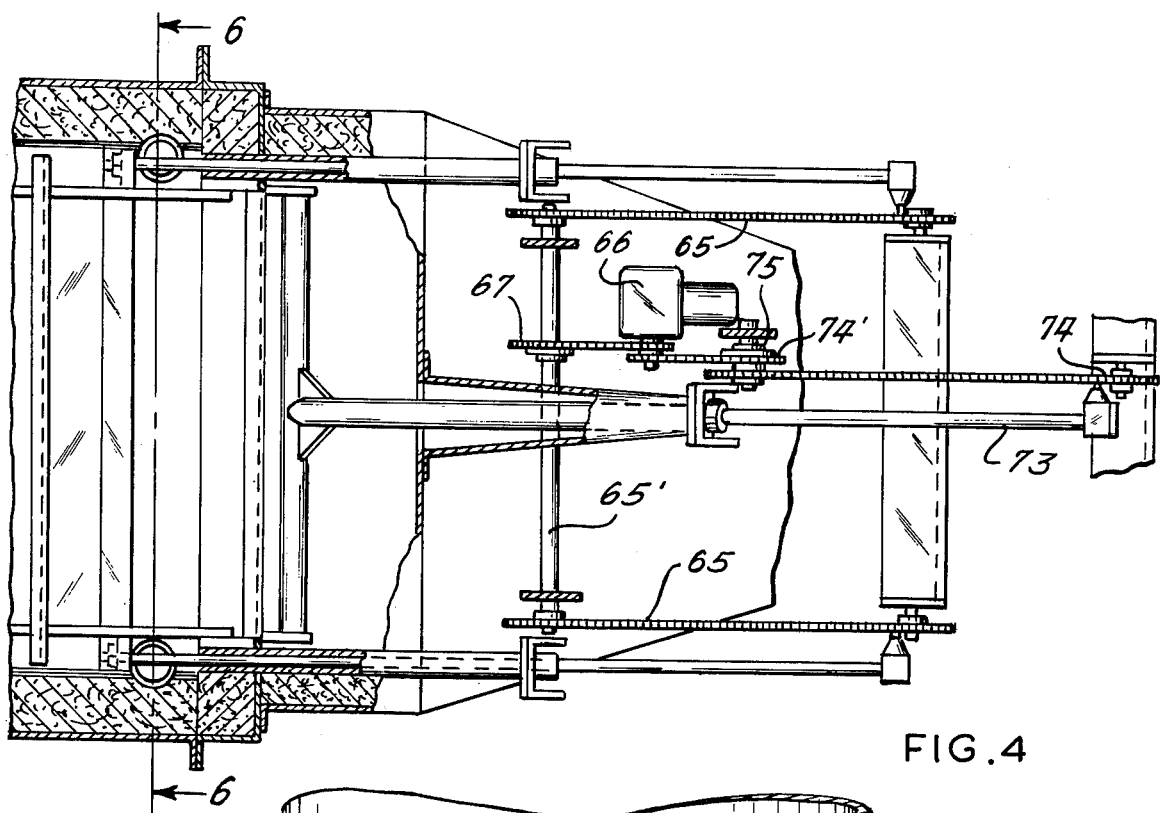
FIG. 4 is a fragmentary horizontal sectional view of the discharge end of the fluidized bed reactor.

The other part of the advancing mechanism 11 is the rake assembly 57 which consists of parallel side bars 68 which are connected by spaced cross rake members 69 which have downwardly projecting tines 70 depending therefrom (FIGS. 2 and 6). The side bars 68 have inclined surfaces 71 aligned with the inclined surfaces 62 and cutout portions 72. This allows the rake assembly 57 to be reciprocated longitudinally and vertically in the chamber 10. Thus, the scrap is pulled in a raking action along the hearth 12 as will be more fully explained hereinafter.

The rake assembly 57 has a rake pull 73 connected to a rake drive chain 74 which is connected through a drive pulley 74' to the variable speed reversible motor 66 by a clutch 75 so that the rake drive 74 can be disconnected from the motor 66.

In operation, the rake 57 and the ramp 58 are both at their leftmost position toward the intake end of the chamber 10. This is shown by the broken lines in FIG. 2. The rake side bars 68 have the track engaging surfaces 68a on the track 60. The rake tines 70 are in their lowermost position engaged with the scrap on the hearth 12. The ramp assembly 58 and the rake assembly 57 are moved in unison toward the discharge end of the chamber 10 by the motor 66 through the drives 65 and 74 until the rightmost ramp member 61 engages a stop 76. This disengages the clutch 67 and the ramp assembly 58 stops. The rake assembly 57 continues to move up the surfaces 62 and thus moves longitudinally and vertically independently of the ramp assembly 58. This disengages the tines 70 from the scrap on the hearth 10. This is the solid line position shown in FIG. 2.

When the rake assembly 57 engages a stop the motor 66 is reversed, the clutch 67 and 75 are re-engaged, and the rake assembly 57 and the ramp assembly 58 are moved leftward in unison toward the intake end of the chamber 10. When the ramp assembly 58 and the rake assembly 57 are in their leftmost position, the motor 66 again is reversed and the rake clutch 75 is disengaged so that the ramp assembly 58 is moved rightwardly or toward the discharge end of the bed 12 independently of the rake assembly 57. This causes the rake assembly to drop vertically so that the rake tines 70 are in engagement with the feed on the bed 12. When the rake drive clutch 75 is re-engaged, the rake assembly 57 is moved rightwardly toward the discharge end of the bed 12 in concert with the ramp assembly 58 to move feed along the hearth 12.

The foregoing cycle is repeated to move the scrap along the hearth 12 by the rightward movement of the tines 70 while in their lowermost position.

As the feed is moved along the bed 12 by the ramp 58 and rake 57, it is surrounded and engaged by the heated particles to calcium carbonate which is fluidized as hereinbefore explained. The heated calcium carbonate engages and decomposes the insulation on the feed as the feed moves along the bed 12. Some of the calcium carbonate reacts with the chlorine or hydrochloric acid produced from the insulation to produce calcium chloride in the chamber 10.

The calcium carbonate material flows across the bed to a weir 23 (FIG. 5) where it is discharged from the chamber 10 and collected in a receiver at 24. The calcium chloride is in the fines which falls over the weir 23 to provide constant removal of a mixed dust of calcium carbonate and calcium chloride. The removal of product is through a rotary air lock feeder 25.

The product collected at 24 is about 10% to about 12% calcium chloride and about 88% to about 90% calcium carbonate.

As mentioned the insulation on the feed material is removed as the feed moves through the chamber 10 on the bed 12. The clean copper wire leaves the decomposition chamber 10 through an exit water seal 26 which also acts as a quench for the wire scrap, thereby cooling and further cleaning the product. The product from the water seal 26 is collected in a receptacle 27 or a bailer for further handling.

The quench tank 26 also is used to dewater and collect any solid calcium carbonate which has been carried over with the wire or which is deposited therein from the HCl scrubber 14 as will be hereinafter explained in more detail. The dewatering device 28 is conventional in the art.

The gases and smoke generated during decomposition in the chamber 10 may contain small amounts of chlorine dependent on the efficiency of the bed reaction. The products of decomposition and any chlorine pass into the afterburner 13 where all of the remaining combustible products are consumed. The afterburner includes a burner 29 and an excess combustion air inlet 30. The afterburner operates at a temperature of about 1400° to about 2000° F.

The burned gases from the afterburner 13 may still contain chlorine as well as the products of combustion. The products of combustion, including the chlorine, from the afterburner 13 are passed through an HCl scrubber 14 where the remaining chlorine and the dust is removed.

The scrubber 14 is of a conventional bubble plate-type and the water on the plates contains $CaCO_3$ so that any chlorine in the gas is neutralized and reacted to form $CaCl_2$. The entering gas is cooled with a water spray containing suspended particles of the calcium carbonate at 31. Water containing the $CaCl_2$ dissolved therein is withdrawn from the scrubber 14 at a pump 32 and sprayed at 33 over the wire leaving the quench tank 26. The $CaCl_2$ stays in solution in the quench tank 26. Some of the solution is bled into the chamber 10 for temperature control where the solids are recovered at 24. Some $CaCl_2$ is also introduced into the chamber 10 with the dewatered $CaCO_3$, and recovered at 24.

The scrubber 14 also removes any dust such as $CaCO_3$ dust, which also passes through the quench tank 26 and via the dewatering device 28 to the $CaCO_3$ storage 21.

From the top of the scrubber 14 are passed the gases free of dust and chlorine. These gases pass through the induced draft fan 15 which provides the pressure differential causing the gases to flow through the system. From the fan 15 the cleaned gases are discharged to the atmosphere through a stack 34.

An emergency by-pass 35 connects the afterburner discharge to the stack 34.

A specific example of the system is designed to process 3000 pounds of material per hour. This system generates 6500 cubic feet per minute of burned gases to the HCl scrubber 14. The afterburner 13 operates at 1600° F. and the decomposition chamber 10 at 1000° F.

MODIFICATION

Figure 7:
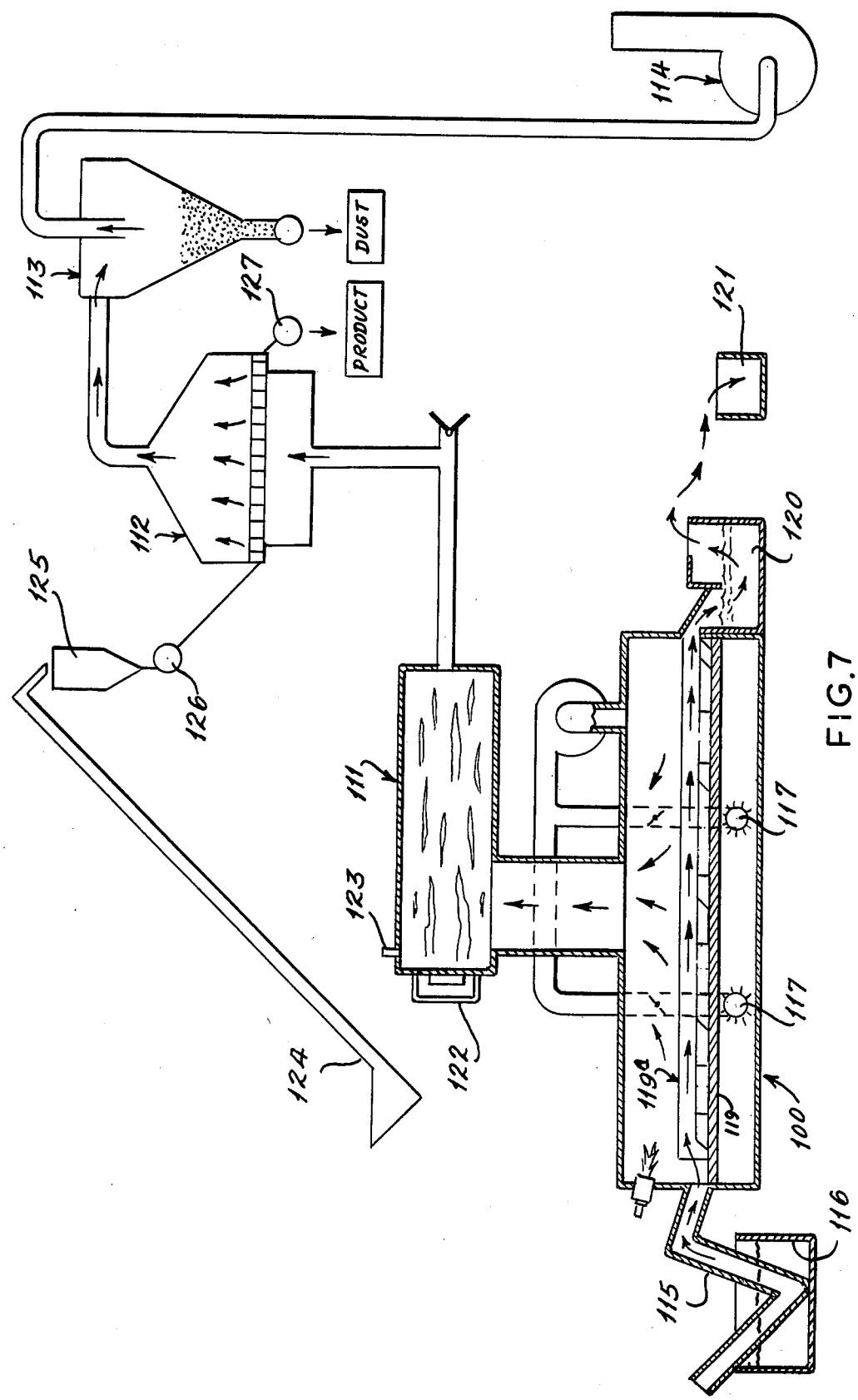
FIG. 7 is a schematic flow diagram of a modification of the process of this invention.

A modification of the process of this invention is shown in FIG. 7. This system comprises a decomposition chamber 100 including an afterburner 111, a fluidized bed reactor 112, a dust collector 113, and an induced draft fan 114. The chopped input material (usually insulated copper wire containing polyvinyl chloride insulation) is continuously fed at a rate controlled by a conveyor 115 through a water trap 116 to the chamber 100.

The cut feed material is moved on the bed 119 by a conveying means 119A similar to the conveying means 11 of FIGS. 1–6, through the decomposition chamber 100 where it is ignited and decomposed in a controlled atmosphere void of excess oxygen and controlled with respect to analysis and temperature by the burners 117. The feed material generally is heated to a temperature from about 600° to 1200° F. for best decomposition.

The insulation on the feed material decomposes and burns in the decomposition chamber 100. The clean copper wire leaves the decomposition chamber 100 through an exit water seal 120 which also acts as a quench for the wire scrap, thereby cooling and further cleaning the product. The product from the water seal 120 is collected in a receptacle 121 or a bailer for further handling.

The gases and smoke generated during decomposition, which contain chlorine, pass into an afterburner 111 where all of the remaining combustible products are consumed. The afterburner includes a burner 122 and an excess combustion air inlet 123. The afterburner operates at a temperature of about 1400° to about 2000° F.

The burner gases from the afterburner 111 still contain chlorine as well as the products of combustion. The products of combustion, including the chlorine from the afterburner 111, are passed through a fluidized bed reactor 112 where the fluidized bed material is a calcium containing substance in a granular form of about −10 to about −200 mesh. The substance preferably is calcium carbonate ($CaCO_3$). The gases from the afterburner 111 act as the fluidizing medium. The intimate contact of the exhaust gases with the calcium carbonate causes a chemical reaction to take place in which the chlorine is reacted with the calcium carbonate to produce calcium chloride. This is similar to that described for the structure of FIGS. 1–6.

The calcium carbonate is deposited in a conveyor 124 where it is carried to a hopper 125 and then passed through a rotary air lock feeder 126 to the fluidized bed reactor 112. The same passes across the bed in fluidized condition to the exit rotary air lock 127. The air lock feeder 126 controls feed of make-up calcium carbonate to the reactor 112 to replace that consumed in the reaction.

From the fluidized bed reactor 112 the gases, less the chlorine, are passed through the mechanical dust collector 113 and then exit through the induced draft fan 114 which provides the pressure differential to flow the gases through the entire system.

A further modification of the system combines the features of FIGS. 1–6 and FIG. 7 and uses a secondary fluidized bed converter to remove any chlorine not reacted in the primary fluidized bed converter.

What is claimed is:

1. A continuous method for removing insulation containing a chlorine producing substance from items comprising the steps of
    A. Feeding the insulation covered items continuously into an enclosed space,
    B. Moving the items through said enclosed space,
    C. Continuously contacting said items with a particulate reactive fluidized medium which includes a calcium containing compound as said items are moved through said enclosed space,
    D. Continuously decomposing the insulation and releasing the reaction chlorine gas therefrom and contacting and reacting the released chlorine gas with the particles of reactive calcium containing fluidized medium, and
    E. Continuously removing insulation-free items from the enclosed space.

2. The method of claim 1 wherein the calcium containing compound is calcium carbonate.

3. The method of claim 2 wherein the calcium chloride reaction product of chlorine and calcium carbonate is recovered.

4. The method of claim 1 wherein the insulated items are wire and including the step of forming the wire into pieces of less than about 6 inches in size before feeding the items into the enclosed space.

5. The method of claim 1 wherein the insulated items are wire and including the step of passing the products of decomposition of the insulation through an afterburner at a temperature of about 1400° to about 2000° F.

6. The method of claim 5 including the step of raising the temperature of the products of decomposition of the insulation to about 600° F in the enclosed space.

7. A continuous method for removing insulation containing a chlorine producing substance from wire comprising the steps of
A. Feeding the insulation covered wire continuously into an enclosed space,
B. Moving the wire through said enclosed space,
C. Continuously contacting said wire with a particulate reactive fluidized medium which includes a calcium containing compound as said wire is moved through said enclosed space,
D. Continuously decomposing the insulation and releasing the reactive chlorine gas therefrom and contacting and reacting the released chlorine gas with the particles of reactive calcium containing fluidized medium,
E. Passing the unreacted products of decomposition of the insulation through an afterburner at a temperature of about 1400° to about 2000° F,
F. Passing the products of combustion from the afterburner through a calcium containing fluid whereby the remaining chlorine is reacted with the calcium in the calcium containing fluid to produce calcium chloride, and
G. Continuously removing insulation-free items from the enclosed space.

8. A continuous method for removing insulation containing a chlorine producing substance from wire comprising the steps of
A. Feeding the insulation covered wire continuously into an enclosed space,
B. Moving the wire through said enclosed space,
C. Continuously contacting said wire with a particulate reactive fluidized medium which includes a calcium containing compound moved through said enclosed space,
D. Continuously decomposing the insulation and releasing the reactive chlorine gas therefrom and contacting and reacting the released chlorine gas with the particles of reactive calcium containing fluidized medium,
E. Passing the unreacted products of decomposition of the insulation through an afterburner at a temperature of about 1400° to about 2000° F,
F. Contacting the products of combustion, after said products have passed through the afterburner, with a fluidized medium formed of particles of calcium containing material, and
G. Continuously removing insulation-free items from the enclosed space.

9. A method of removing chlorine containing insulation from copper wire without discharging undesirable chlorine by-products comprising the steps of
A. forming the insulated wire into pieces of less than about 6 inches in size,
B. treating the wire in a heated fluidized bed in which the fluidized medium is a reactive calcium compound,
C. decomposing the insulation and reacting chlorine released thereby with the reactive calcium fluidized medium to produce calcium chloride,
D. treating the gaseous products of the decomposition with a calcium containing fluid to remove any remaining unreacted chlorine, and
E. recovering the wire with insulation removed.

10. The method of claim 9 wherein the calcium compound is calcium carbonate.

11. The method of claim 9 wherein the fluidized calcium compound is from about −10 mesh to about −200 mesh in size.

* * * * *